US005421550A

United States Patent [19]

Palmer

[11] Patent Number: 5,421,550

[45] Date of Patent: Jun. 6, 1995

[54] MOUNTING APPARATUS

[75] Inventor: Marvin K. Palmer, Oswego, Ill.

[73] Assignee: Caterpillar Inc., Peoria, Ill.

[21] Appl. No.: 261,071

[22] Filed: Jun. 16, 1994

[51] Int. Cl.$^{6}$ .............................................. F16M 11/00

[52] U.S. Cl. .................................... 248/200; 248/201; 248/300; 248/558

[58] Field of Search ............... 248/154, 200, 201, 300, 248/309.1, 316.4, 316.8, 558, 911, 912

[56] References Cited

U.S. PATENT DOCUMENTS

| | | | |
|---|---|---|---|
| 268,416 | 12/1882 | Lane | 248/154 |
| 849,656 | 4/1907 | Brennan | 248/201 |
| 895,892 | 8/1908 | Peters . | |
| 1,008,803 | 11/1911 | Ely . | |
| 1,487,372 | 3/1924 | Cobel; R. . | |
| 1,785,746 | 12/1930 | Pilling . | |
| 1,909,708 | 5/1933 | Neuwirth . | |
| 2,526,009 | 10/1950 | Daniels | 248/156 |
| 2,954,199 | 9/1960 | Greer | 248/201 |
| 3,003,728 | 10/1961 | Shaw | 248/154 |
| 3,224,595 | 12/1965 | Sherley | 211/83 |
| 3,689,016 | 9/1972 | Hammon | 248/309.1 |
| 3,702,157 | 11/1972 | Thomas | 169/1 R |
| 5,037,048 | 8/1991 | Freed, Jr. | 248/154 |

FOREIGN PATENT DOCUMENTS

| | | | |
|---|---|---|---|
| 0062748 | 5/1982 | Japan | 248/558 |

*Primary Examiner*—Leslie A. Braun
*Assistant Examiner*—Catherine S. Collins
*Attorney, Agent, or Firm*—William C. Perry

[57] ABSTRACT

It is common in the design of modern day construction equipment to utilize one or more hydraulic systems that may require the use of a pressurized accumulator. Since the rating requirements for the respective systems can vary from country to country, it is necessary to provide mountings for various sizes of accumulators. In some instances an entire mounting apparatus has been required for each size adding needlessly to the expense and complexity of the mounting design, In the subject invention, a mounting apparatus is provided for accumulators that utilizes a pair of vertically spaced brackets. Mounting fasteners are provided that are centered on an axis that is spaced from a wall of the machine a distance greater than the radius of the largest accumulator that will be utilized. Being so positioned, the same mounting fasteners may be utilized to mount accumulators of various diameters.

22 Claims, 3 Drawing Sheets

MOUNTING APPARATUS

TECHNICAL FIELD

This invention relates to an apparatus used in mounting an object to a frame and more particularly to an apparatus that will mount accumulators of various diameters to a frame.

BACKGROUND ART

In the operation of construction machinery, it is quite common to utilize an accumulator for any number of systems including steering, braking, ride control or any other system in which it is desirable to store energy. The size of the accumulator is governed by its particular use within each of these respective systems as well as government regulations that pertain to various functional specifications of an accumulator. These regulations are known to vary from country to country and accommodations must be made to provide for the mounting of accumulators of varying sizes.

Another requirement in the mounting of an accumulator resides in the display of a plate or other type of label that indicates the pressure rating of the accumulator. This plate is often positioned in random fashion on the outer surface of the accumulator and accommodations must be made in the mounting of the accumulator to rotate the vessel to provide proper display of the rating indicator.

One mounting assembly that has been successfully utilized includes a pair of strap assemblies that extend around the outer portion of the accumulator. The strap assemblies are vertically spaced from one another and are tightly secured to the frame on opposite sides of the accumulator. The fastening means are generally threadable and may be tightened sufficiently to clamp the accumulator securely to the frame. In addition, the accumulator may be rotated prior to its attachment to position the rating plate in a clearly visible location, usually between the straps. While this mounting apparatus has been known to perform in an adequate fashion, its versatility is limited in that the strap assemblies normally must be varied with the diameter of the accumulators. This requires multiple strap assemblies which can be inconvenient in their storage. The multiplicity of components also tends to be rather costly as well.

The present invention is directed to overcoming one or more of the problems set forth above.

DISCLOSURE OF THE INVENTION

In one aspect of the present invention, a mounting apparatus is provided to mount a first member to a frame. The first member defines a longitudinally extending axis and first and second radially extending end faces that are spaced from one another along the axis. A plurality of mounting bores are defined in each of the respective end faces and are positioned in a circular pattern having a radius of a preselected length that is centered on the axis. A first mounting bracket is connected to the frame and extends outwardly therefrom. The first bracket defines a first and second surface and a bore that is formed therebetween to define a circular wall about a second axis. The bore is of a size sufficient for encompassing the plurality of mounting bores defined in one of the respective end faces. A plurality of fastening members is provided, each having a first end portion sufficient for engagement with one of the respective mounting bores, a second end portion sufficient for engagement with the first surface of the first bracket and a third portion extending between the first and second end portions. The third portion is sufficient for contact with the wall formed by the bore in the first bracket to position the axis of the first member in coincident relationship to the second axis of the bore.

In another aspect of the invention, a mounting apparatus is provided between a first member and a frame. The first member includes first and second end portions defined along a generally centrally disposed first axis and a mounting means defined on the first end portion. The mounting means is positioned in a substantially circular array about said first axis. A first bracket is connected to the frame in a manner to extend outwardly therefrom. The first bracket has a first flange that defines a bore that extends through the first flange about a second axis. A means for fastening the first member to the first bracket is positioned within the bore in the first bracket to pilot the position of the accumulator so that the first axis thereof is substantially coincident with the second axis defined by the bore.

With the mounting apparatus as set forth above, an accumulator may be mounted to the frame of a machine in a manner that utilizes the axis of the accumulator as point of reference. In doing so, the mounting apparatus may be designed to extend from the frame a preselected distance from the frame to allow accumulators of different diameters to be mounted with essentially the same hardware. This greatly reducing the complexity of the arrangement as well as the associated cost since the components of only one mounting apparatus are required to mount accumulators of varying sizes and capacities.

BEST MODE FOR CARRYING OUT THE INVENTION

Figure 1:
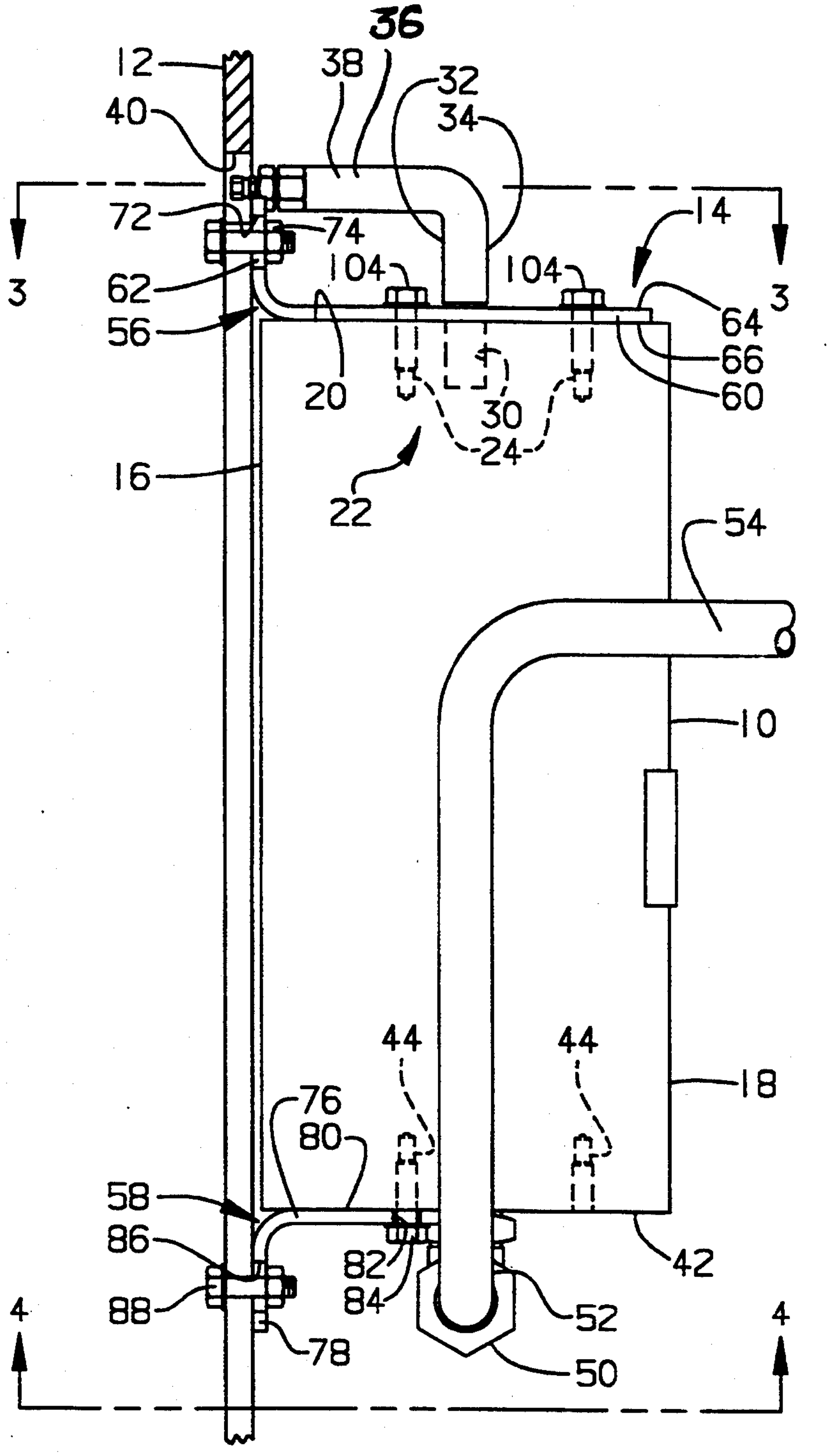
FIG. 1 is a diagrammatic side view of a mounting apparatus that embodies the principles of the present invention.

Referring to the drawings, it can be seen that a generally cylindrical accumulator 10 is secured to a frame 12 of any suitable machine by a mounting apparatus 14 that will be described in greater detail hereinafter. The accumulator defines a pair of substantially identical end portions 16 and 18 that are spaced from one another along a centrally disposed, longitudinally extending axis X. The first end portion 16 defines a first radially extending endface 20 that has a mounting means 22 (FIG. 1) defined thereon. While it is to be understood that the mounting means could include any number of suitable methods of attachment, a plurality of threaded mounting bores 24 are shown and described herein. For purposes of illustration, three bores are utilized and are spaced equidistantly along a bolt circle 26 that is centered about axis X in a triangular configuration.

A first port 30 is defined in the first endface 20 and is substantially centered about the axis X. The port 30 defines a plurality of screw threads that are adapted to receive a fitting 32 defined by a first end portion 34 of a first conduit or hose 36. A second end portion 38 of the conduit 34 extends through an access port 40 formed in the frame 12. The second end portion 38 functions as a charging port for the conduit 36 and delivers a gas or any other suitable compressible medium to the first or upper portion of the accumulator 10 to pressurize or charge the accumulator.

Figure 4:
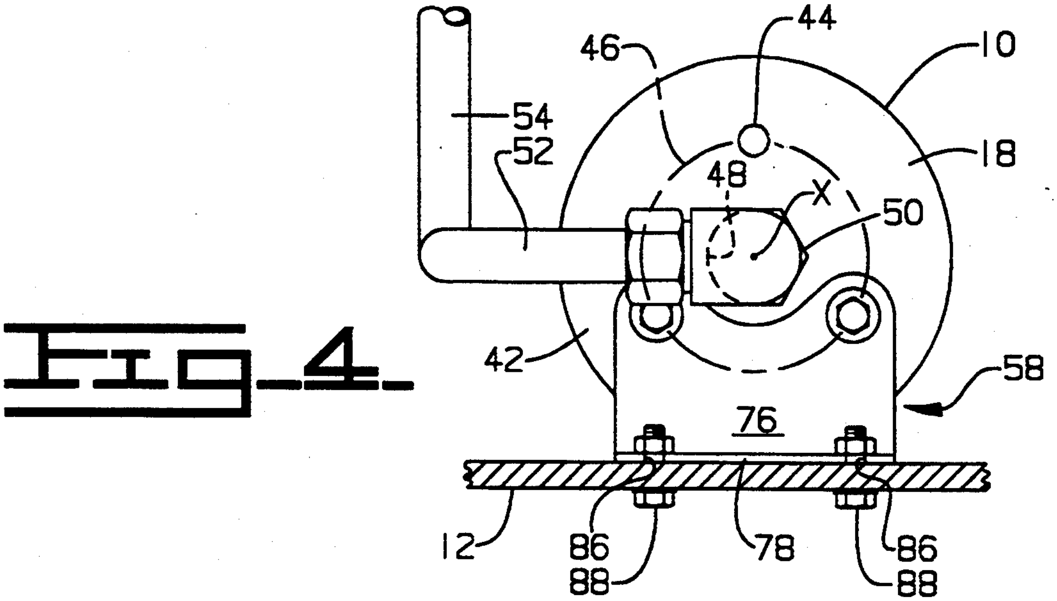
FIG. 4 is a diagrammatic bottom view taken along lines 4—4 of FIG. 1.

The second end portion 18 of the accumulator 10 defines a second radially extending endface 42 that is spaced axially from and parallel to the first endface 20. A plurality of mounting bores 44 are defined in the second endface 42 along a second bolt circle 46 that is the same diameter as that of bolt circle 26 defined in the first endface 20. As can be seen in FIG. 4, three mounting bores are equidistantly spaced along the bolt circle 46. Depending on the method utilized to manufacture the accumulator, the mounting bores 44 may be positioned in axial alignment with a corresponding mounting bore 24 defined in the first endface 20 or the two sets of mounting bores may be positioned randomly. A second port 48 (FIGS. 2 and 4) is defined in the second endface 42 and is centered about the axis X. The second port defines a plurality of screw threads that are sufficient to receive a fitting 50. The fitting 50 is positioned on a first end portion 52 of a second conduit or hose 54 that communicates hydraulic fluid between the accumulator and any one of various types of hydraulically actuated systems (not shown) such as a ride control system.

The accumulator 10 is secured to the frame 12 by a pair of-mounting brackets 56 and 58. The first mounting bracket 56 (FIGS. 2 and 3) includes first and second flanges 60 and 62 that are positioned generally at a right angle to one another. The first flange 60 defines a first or upper surface 64 and a second or lower surface 66. The first flange extends in a generally horizontal orientation as viewed in the drawings, and is positioned immediately above and parallel to the first endface 20 in a manner to be engageable therewith. A bore 68 extends through the first flange about an axis that extends parallel to and is substantially coincident with the first axis X. The bore 68 defines a circular wall that extends between the first and second surfaces 64 and 66. The diameter of the bore 68 is sufficient to encompass threaded mounting bores 24 defined in the first endface 20.

The second flange 62 extends upwardly from the first flange 60 in a generally vertical direction as viewed in the drawings and defines a plurality of bores 72 that extend therethrough. The bores receive a suitable fastening member 74, such as a bolt, that will secure the second flange 62 to the frame 12 to position the first flange 64 in a normal or horizontal relationship to the frame.

The second mounting bracket 58, which is best shown in FIGS. 1 and 4, defines first and second flanges 76 and 78 that are positioned in normal orientation to one another. The first flange 76 is shown to extend in a generally horizontal direction and is positioned parallel to and subjacent the second endface 42 of the accumulator 10. The first flange defines a first or upper surface 80 that is engageable with the second endface 42. A pair of bores 82 (FIGS. 1 and 2) are defined in the first flange 76 and are positioned therein in a manner that will permit them to be aligned with any two of the mounting bores 44 defined in the second endface 42 of the accumulator. A pair fasteners in the form of mounting bolts 84 are received within the bores 82 and are threadably engaged with the mounting bores 44 to secure the accumulator 10 to the first flange.

The second flange 78 extends from the first flange 76 in a generally vertical direction and defines a pair of bores 86 (FIGS. 1 and 4). The bores 86 receive a fastener of any suitable type such as bolts 88 which serve to secure the flange and therefore the second mounting bracket 58 to the frame 12.

Figure 3:
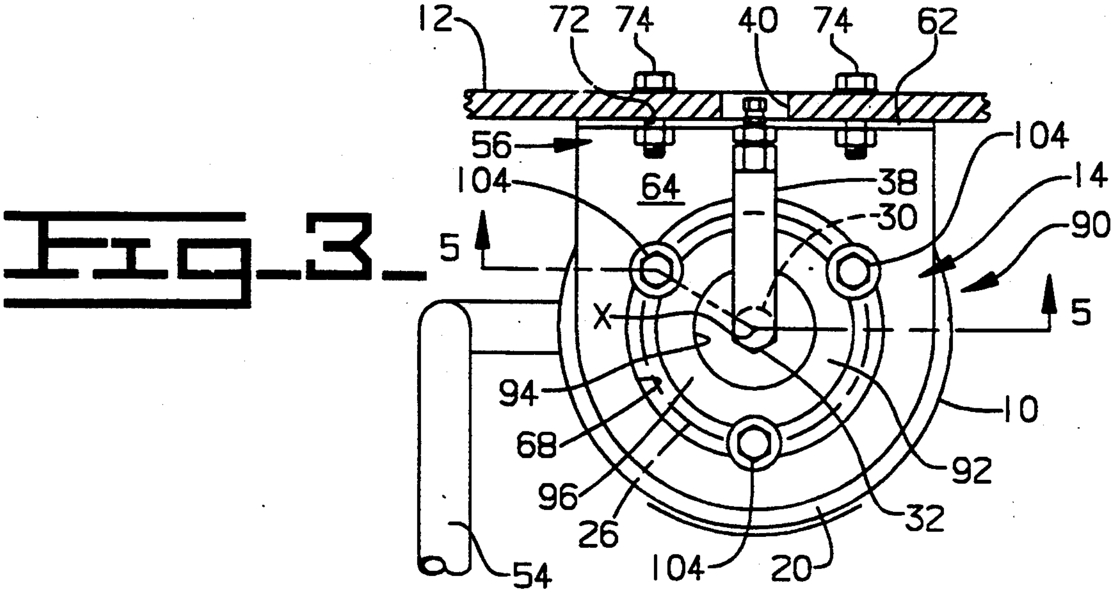
FIG. 3 ms a diagrammatic top view taken along lines 3—3 of FIG. 1.
Figure 5:
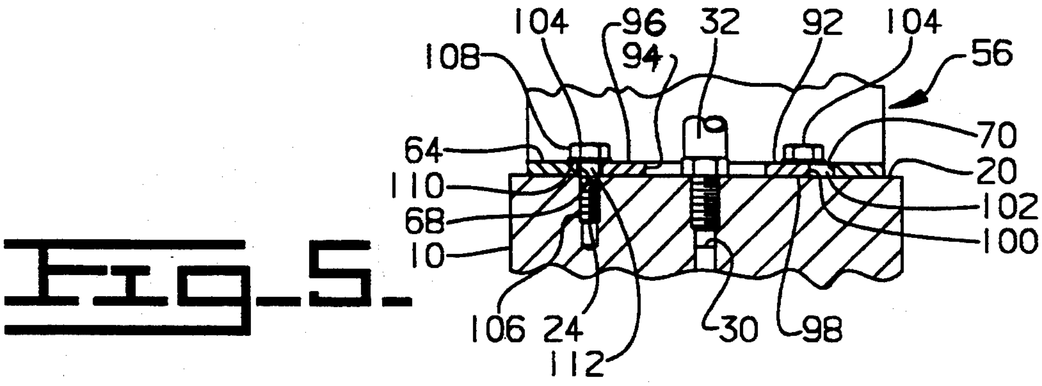
FIG. 5 is a diagrammatic section view taken along lines 5—5 of FIG. 3.

The accumulator is secured to the first mounting bracket 56 by a fastening means 90, shown best is FIGS. 3 and 5. The fastening means includes a disc member 92 that defines a centrally disposed bore 94, a first, upper surface 96 and a second, lower surface 98 and an outer peripheral wall 100 that extends between the respective surfaces. The diameter of the disc is small enough to permit its insertion within the bore 68 so that the lower surface 98 will rest on the first endface 20 defined by the accumulator. With the disc positioned within the bore 94, centrally disposed about axis X, an annular space 102 of a preselected size is created between the outer wall 100 and wall 70 defined by the bore 68. The space 102 is sized to encompass the mounting bores 24 defined in the first endface 20. A plurality of fastening members 104, which are shown in the drawings to be bolts, are positioned for engagement with each of the mounting bores. Each bolt defines a first, threaded end portion 106 that is threadably engaged with the respective mounting bores 24. The bolt has a second end portion 108, or bolt head that defines an engagement surface 110 on the underside thereof that is of sufficient diameter to contact the upper surface 64 of the first flange 60 and the upper surface 96 of the disc member 92. A third portion 112, or shank, extends between the bolt head 108 and the threaded end portion 104 and is generally cylindrical in shape having a diameter that is generally equal to or just slightly smaller than the space 102. Being sized as such, the cylindrical portion of the bolt may contact the wall 70 of the bore 68 and the wall 100 of the disc member. In doing so, the disc is actually piloted by the spacing of the bolts 104 within the annular space 102 to position the disc concentrically within the bore 94. With the position of the disc member being captured as such, a secure clamping surface for the bolt head is provided by the upper surface 96 of the disc 92 and by the first surface 64 of the first mounting bracket 56 on opposite sides of the bolts 104. With the bolt in a first or fastening position, the engagement surface 110 on the underside of the bolt head is in clamping engagement with the surfaces 64 and 98. Conversely, the bolt head is moved away from engagement with the surfaces 64 and 98 to release the clamping engagement.

Industrial Applicability

When mounting an accumulator 10 to a vehicle, the first and second mounting brackets 56 and 58 respectively, are secured to a suitable wall of the frame 12. The second flange 62 of the first mounting bracket 56 is secured to the wall by a pair of fasteners 74 that are received within mounting bores 72. Likewise, the second flange 78 of the second bracket 58 is secured to the wall by a pair of bolts 88. The second bracket is spaced vertically below the first bracket a distance that is approximately the same as the total length of the accumulator 10. Each mounting bracket is mounted to position the first flanges 60 and 76 respectively, in parallel relationship to one another in a generally horizontal orientation that is substantially normal to the wall of the frame 10.

Figure 2:
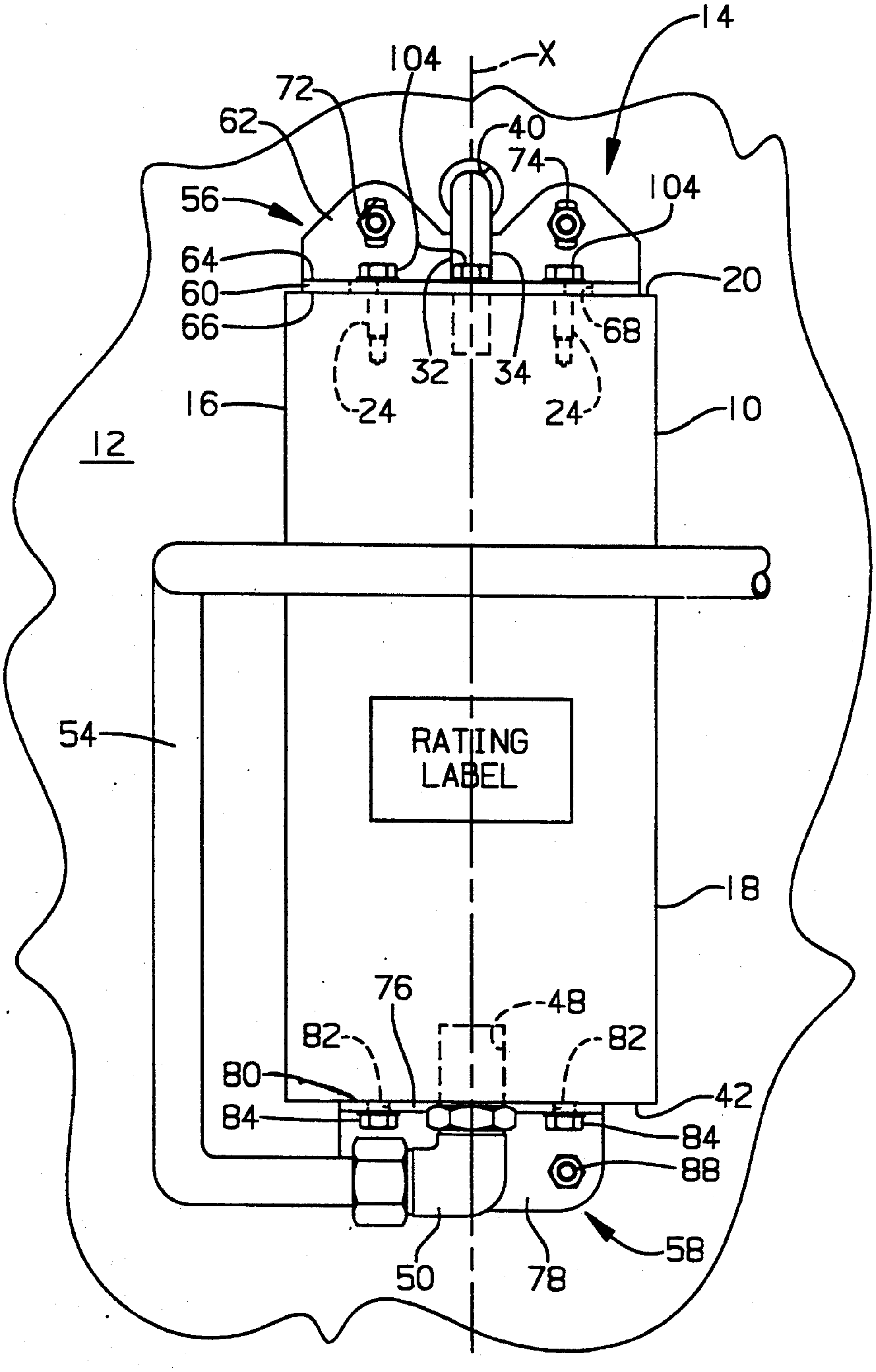
FIG. 2 is a diagrammatic front view of the mounting apparatus shown in FIG. 1.

The accumulator is positioned upon the first flange 76 of the second bracket with the lower, or second endface 42 positioned for resting engagement with the upper surface 80. The accumulator may be rotated until the two apertures 82 defined in the first flange 76 are aligned with any two of the mounting bores 44 defined in the second endface. Since it is important that the rating of the accumulator is identified and positioned for optimum viewing, the accumulator may be rotated until two apertures 82 align with the appropriate mounting bores 44 to achieve the desired positioning of the rating indicia (FIG. 2). The mounting bolts 84 are then threadably engaged with the mounting bores 44 to secure the accumulator to the second mounting bracket 58.

With the second end portion 18 of the accumulator 10 being secured to the second mounting bracket 58, the first end portion 16 of the accumulator is positioned with the first radially extending endface 20 immediately subjacent the second surface 66 of the first mounting bracket 56. The axis X of the accumulator is positioned to be generally coincident with the axis of the bore 68. The bore 68 is thus positioned to be substantially tangent to an outer portion of the threaded mounting bores 24 defined in the first endface 20 (FIG. 5). The disc member 92 is positioned concentrically within the bore 68 with the centrally disposed bore 94 thereof in registry with the first port 30 formed in the first endface 20. In this position, the periphery of the disc member 92 is generally tangent to an inner portion of the threaded mounting bores 24.

The bolts 104 may be threadably engaged with the mounting bores 24 and rotated to a first position wherein the underside 110 of the bolt head 108 is engaged with the upper surface 64 of the mounting bracket 56 on the radially outer portion of the bolt head and with the upper surface 96 of the disc member 92 on the radially inner portion of the bolt head. This effectively secures the upper end portion 16 of the accumulator 10 to the first mounting bracket 56.

It should be noted that while the second mounting bracket 58 is shown to have two apertures 82 that are alignable with any of the mounting bores 44 to position the rating label in a visibly desirable position, a mounting bracket identical to that of the first mounting bracket 56 may also be used. In doing so, identical brackets could be used for mounting both the top and bottom end portion of the accumulator. This type of mounting would allow the rotational positioning of the accumulator could be infinite. This would be beneficial if the accumulator were equipped with a fitting or other device mounted on an external portion thereof, other than a rating label, that may require positioning at a predetermined location. This type of bracket arrangement would lend itself to the more accurate positioning of the externally located device.

When the accumulator is secured in place, the fitting 32 of conduit 36 may be threadably engaged with the port 30 in the first radial endface 20. The second end portion 38 is accessible through port 40 for charging the accumulator. Likewise, the fitting 50 may be threadably engaged with the port 48 defined in the second endface 42. In so doing, connection of the second conduit 54 with the accumulator enables the selective operation of the accumulator with one of several vehicle systems such as ride control, for example.

With an accumulator mounting of the type described above, it can be seen that all of the mounting components are generally centered about the vertical axis X. The first mounting flanges 60 and 76 of the respective first and second mounting brackets 56 and 58 are designed to have a length that extends from the wall of the frame 10 a distance that is at least equal to the radius of the largest accumulator that any of the vehicle systems would require. This enables the same mounting apparatus to be utilized for various sizes of accumulators as long as the mounting bores 24 and 44 in the respective endfaces 20 and 42 are positioned on a bolt circle 26 that remains common between the various sizes of accumulators.

Other aspects, objects and advantages of this invention can be obtained from a study of the drawings, the disclosure and the appended claims.

I claim:

1. A mounting apparatus, comprising:

a frame;

a first member defining a longitudinally extending axis, first and second radially extending end faces that are spaced from one another along said axis and a plurality of mounting bores defined in each of the respective end faces, said respective plurality of mounting bores being positioned along a circle having a radius of preselected length that is centered on said axis;

a first mounting bracket connected to said frame and extending outwardly therefrom, said bracket defining a first and second surface and a bore formed therebetween to define a circular wall about a second axis, said bore being of a size sufficient for encompassing the plurality of mounting bores defined in one of the respective end faces; and a plurality of fastening members, each having a first end portion sufficient for engagement with one of the respective mounting bores, a second end portion adapted to engage the first surface of the first bracket and a third portion extending between the first and second end portions and adapted to contact the wall formed by the bore in the first bracket to position the axis of the first member in coincident relationship to the second axis of said bore.

2. The mounting apparatus as set forth in claim 1 wherein a disc member having first and second surfaces and a wall defined therebetween is positionable within the bore defined by the first bracket member, the diameter of the disc member being sufficient to permit contact between the wall of the disc member and the third portion of the respective fastening members along a portion of said third portion that is substantially opposite the point of contact between the third portion of the respective fastening members and the wall formed by the bore and with the first surface of the disc in contact with the second end portion of the respective fastening members.

3. The mounting apparatus as set forth in claim 2 wherein the fastening members are bolts, each bolt having a threaded first end portion that is engageable with the respective mounting bores in one of the respective end faces of the first member and a second end portion in the form of a bolt head, the underside of which forms a contact surface that is engageable with the first surface of the first bracket and a third, cylindrical portion between the bolt head and the threaded portion comprises a shank having a surface that is engageable with the wall defined by the bore of the first bracket and the wall defined by the disc member.

4. The mounting apparatus as set forth in claim 3 wherein the bolts are moveable between an engaged condition, wherein the bolt head is engaged with the respective first surfaces of the bracket member and the disc member and the first end face of the first member is maintained in contact with the respective second surfaces of the first bracket and the disc member, and a disengaged condition wherein the bolt head and first end face of the first member are removed from contact with the respective first and second surfaces of the first bracket and the disc member.

5. The mounting apparatus as set forth in claim 1 wherein three mounting bores are defined in each of the first and second end faces of the first member and are spaced equidistantly about the axis defined by the first member.

6. The mounting apparatus as set forth in claim 5 further including a second bracket member connected to the frame and having a pair of apertures defined therein, said second bracket having sufficient length to extend from the frame subjacent the second end face defined by the first member, with said apertures aligned with at least two of the mounting bores defined in the second end face.

7. The mounting apparatus as set forth in claim 6 wherein a pair of threaded fasteners are receivable within the apertures defined by the second bracket and are threadably engageable with the mounting bores to secure the second end face of the first member to the second bracket.

8. The mounting apparatus as set forth in claim 7 wherein the first member is a cylindrically shaped accumulator having a preselected diameter having a radius that is less than the distance between the frame and second axis defined by the bore in the first bracket.

9. The mounting apparatus as set forth in claim 2 wherein the disc member defines a generally centrally disposed bore that is alignable with a first port defined in the first end face of the first member, said port being generally centered along the longitudinally extending axis of said first member and adapted to communicate with a fluid conduit for delivery of pressurized fluid to the first member for pressurization thereof.

10. The mounting apparatus as set forth in claim 9 wherein the first member includes a second port that is defined on the second end face along said longitudinally extending axis and is sufficient for receiving a fluid conduit that will deliver pressurized fluid from the first member.

11. The mounting apparatus as set forth in claim 1 wherein the first bracket further includes a first flange that defines said first and second surfaces and the bore and a second flange that extends from the first flange in a direction that is normal to the first flange, said second flange adapted to attach to the frame in a manner to position the first flange in an orientation that is substantially normal to the frame.

12. The mounting apparatus as set forth in claim 6 wherein the second bracket further includes a first flange that defines the apertures that are alignable with the mounting bores in the second end face of the first member and a second flange that extends from the first flange in a direction that is normal to the first flange, said second flange adapted to attach to the frame in a manner to position the first flange in an orientation that is substantially normal to the frame.

13. A mounting apparatus, comprising:

a frame;

a first member having first and second end portions defined along a generally centrally disposed first axis and a mounting means defined on the first end portion, said mounting means being substantially centered about said first axis;

a first bracket connected to the frame in a manner to extend outwardly therefrom, said first bracket having a first flange that defines a bore extending therethrough about a second axis;

a disc member having a preselected diameter smaller than that of the bore defined in the first bracket and being positioned within said bore in concentrically spaced relationship therewith;

means for fastening the first member to the first bracket, said fastening means being positioned within space extending between the bore in the first bracket and the disc member to provide contact with the fastening means on at least two sides thereof to thereby pilot the position of the first member so that the first axis thereof is substantially coincident with the second axis defined by the bore.

14. The mounting apparatus as set forth in claim 13 wherein the first member is a generally cylindrical accumulator having a first radially extending end face defined by the first end portion thereof and a second radially extending end face defined by the second end portion thereof.

15. The mounting apparatus as set forth in claim 14 wherein the fastening means further defines three axially extending, threaded mounting bores opening onto each of the respective first and second end faces, each of said mounting bores defined in the first end face being in axial alignment with one of the respective mounting bores defined in the second end face.

16. The mounting apparatus as set forth in claim 15 wherein the first mounting bracket further includes:

a first and second surface positioned on opposing sides of the first flange, said bore being positioned to extend therebetween;

a second flange connected to said first flange, said second flange adapted to attach to the frame in a manner wherein the first flange is positioned to extend from the frame in a direction that is generally normal thereto.

17. The mounting apparatus as set forth in claim 16 wherein the second surface defined by the first flange of the first mounting bracket is secured to the first radially extending end face of the accumulator by the fastening means.

18. The mounting apparatus as set forth in claim 17 wherein the disc member defines first and second engagement surfaces, the first engagement surface adapted to contact a plurality of fastening members and the second engagement surface adapted to engage the first radially extending end face.

19. The mounting apparatus as set forth in claim 18 wherein the fastening members further includes:

a first end portion having a plurality of threads formed thereon and being engageable with the threaded mounting bores defined in the first end face of the accumulator;

a second end portion that defines a surface that is engageable with the first surfaces of the first bracket and the disc member; and a third portion that extends between the first and second end portions and is positioned within the space between the bore in the first bracket and the disc member in close proximity to both the bore and the disc member.

20. The mounting apparatus as set forth in claim 19 wherein a second bracket member is positioned adjacent the second end portion of the accumulator and is adapted to attach to both the accumulator and the frame.

21. The mounting apparatus as set forth in claim 20 wherein the second bracket further includes:

a first flange defining first and second surfaces and a pair of apertures extending therethrough, said apertures being alignable with a selected pair of the mounting bores defined in the second end face of the accumulator and of sufficient size to receive a pair of fastening members therein to secure the first flange to the accumulator; and a second flange connected to the first flange and adapted to attach to the frame.

22. The mounting apparatus as set forth in claim 14 wherein the distance between the frame and said bore's second axis is greater than the radius of the accumulator to provide a mounting apparatus for accumulators of varying diameters.

* * * * *